(No Model.)

J. A. EVERITT.
GARDEN CULTIVATOR.

No. 460,633.      Patented Oct. 6, 1891.

Witnesses:
Frank W. Warner
Harry W. Ballard

Inventor:
James A. Everitt
By Joseph A. Minturn
Attorney.

UNITED STATES PATENT OFFICE.

JAMES A. EVERITT, OF INDIANAPOLIS, INDIANA.

GARDEN-CULTIVATOR.

SPECIFICATION forming part of Letters Patent No. 460,633, dated October 6, 1891.

Application filed December 11, 1890. Serial No. 374,388. (No model.)

*To all whom it may concern:*

Be it known that I, JAMES A. EVERITT, a citizen of the United States, residing at Indianapolis, in the county of Marion and State of Indiana, have invented certain new and useful Improvements in Garden-Cultivators; and I do hereby declare the following to be a full, clear, and exact description of the invention, such as will enable others skilled in the art to which it appertains to make and use the same.

This invention relates to improvements in garden-tools, and has special reference to improvements in wheeled cultivators, such as are propelled by the operator, without the services of a draft-animal.

The object of the invention is, first, to provide means for forcing the plow forward without using the hands, in order to leave the hands free to manipulate the implement to act on the soil; second, to cheapen, simplify, and improve the construction of garden-tools of this class by providing an approximately straight one-piece propelling-bar that will transmit the driving-power in an approximately straight line from the body of the operator to the supporting and driving wheel; third, to provide a hinged connection between the plow-beam and the other parts of the tool, so as to allow free vertical and horizontal movement of the beam, whereby the depth of tillage and proximity of cultivation to the growing vegetables may be varied and readily controlled by the hands, and, fourth, to so construct the hinged connection between the plow-beam and the axle or propelling-bar that, while free vertical and horizontal movement will be secured, the unsteady and shifting movement of a swivel-joint will be avoided. I accomplish these objects by the mechanism illustrated in the accompanying drawings, in which—

Figure 1:
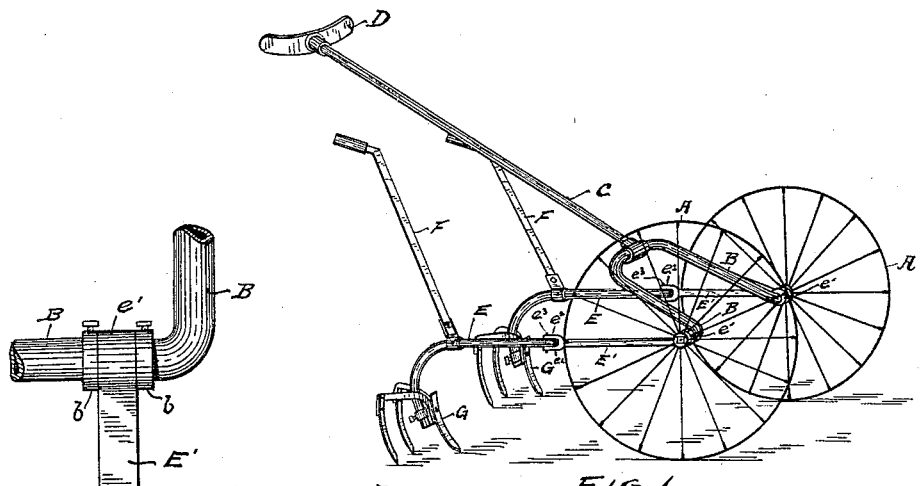
Figures 2, 5:
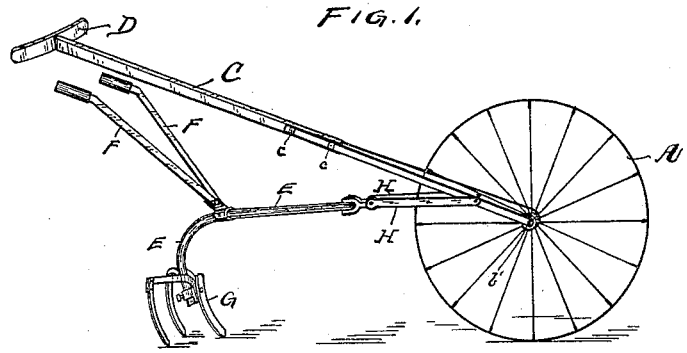
Figure 6:
Figure 3:
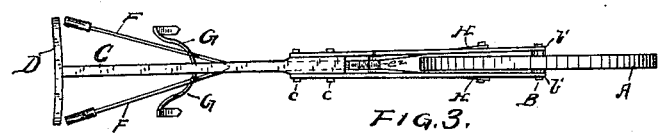
Figure 4:

Figure 1 is a perspective view of a two-wheeled garden-cultivator constructed in accordance with the spirit of this invention; Fig. 2, a perspective view of a single-wheeled implement; Fig. 3, a top or plan view of the construction shown in Fig. 2; Fig. 4, a detail in side elevation of the extended hinge for connecting the plow-beam to the axle in the two-wheeled cultivator; Fig. 5, a detail in plan view of parts of the axle and hinge used in the two-wheeled construction, and Fig. 6 a vertical section of the shortened hinge used in the single-wheeled cultivator.

In the two-wheeled cultivator shown in Fig. 1, A are the supporting and driving wheels; B, the axle; C, the propeller-bar; D, the bearing-plate; E, the plow-beams; F, the handles, and G the implement to act on the soil.

The axle B will vary in construction to suit the size of the driving-wheels A. Where it is desired to use driving-wheels of small diameter, the axle will be cranked upwardly in the direction of the propeller-bar, so as to afford sufficient clearance below the axle for the vegetables, it being necessary to straddle the row in order to cultivate on both sides at once; but with wheels of sufficient diameter to give the proper clearance a straight axle may be used. For combined lightness and strength gas-pipe will be used in constructing the axle, although other material, either wood or iron, and solid in cross-section, might be used without departing from the spirit of this invention. The propeller-bar C may be of wood or of gas-pipe, as shown in the drawings. In the construction here shown the axle is made in halves, which are connected by screwing the inner ends into a T-coupling of common form, and the propeller is connected to the axle by screwing its lower end into the T. The bearing-plate D is intended to present an extended bearing-surface to the operator, so that by pressing against it with his body a sufficient area will be presented to prevent bruising. It may be curved or straight and of any suitable shape, as round, oval, &c., and, if desired, may be padded to insure additional comfort and ease. The propeller-bar will be fastened rigidly to the axle and will have only vertical adjustment by the turning of the axle in the wheels.

The plow-beam E will preferably be of gas-pipe, bent down at its rear end to give support to the implement to act on the soil, which may be a plow-shovel, a harrow, or any of the well-known attachments used on plows of like construction. They will be removably secured and interchangeable with a series of other attachments, as above described. The plow-beam will be connected to the axle by means of a double hinge to allow vertical and horizontal adjustment of the beam. One part of this hinge will be an eye $e'$, through which the axle B will be projected. By this construction the vertical adjustment of the plow-beam is secured. The other part of the hinge will be bifurcated to receive the end of the plow-beam, which will be inserted between the two ears $e^2$ and pivotally secured by means of a vertical pin $e^3$, so as to allow free horizontal movement of the beam.

To prevent striking the wheel when the beam is thrown outwardly, the connection E' between the two parts of the hinge is elongated, as shown in Fig. 4, so as to bring the point of horizontal adjustment beyond the wheel far enough to prevent contact.

To keep the eye $e'$ from slipping longitudinally on the axle, the collars $b$ on each side of the eye and fastened with a set-screw are used.

To adapt these principles of construction to the requirements of a one-wheeled cultivator, it is necessary to construct a propeller-bar with a bifurcated lower end, between the forks of which the driving and supporting wheel B, Figs. 2 and 3, will be journaled. This will be done by making the eyes $b'$ in each of the forks and passing a short shaft B through the eyes and the hub of the wheel. In the drawings the upper portion of the propeller-bar is of wood and in one piece and the bifurcated portion constructed of strap-iron bolted on opposite sides to the lower end of the bar by the bolts $c$. The plow-beam is connected to the propeller-bar preferably by the double interposing link H, which is added in order to get the draft as near to the axle as possible. If desired, this double link might connect directly with the axle. The plow-beam is secured to the link H by a compound hinge similar in operation and construction to that described for the two-wheeled cultivator, with the exception that the elongated bar E' is unnecessary, and is consequently shortened.

In the two-wheeled cultivator two plow-beams are used, and one handle is attached to each beam.

In the one-wheeled cultivator but one beam is used, and both handles are fastened to the same beam.

I claim—

1. In a two-wheeled garden-cultivator, the driving and supporting wheels A, axle B, propelling-bar C, and beams carrying the implement to operate on the soil, said beams having free vertical adjustment and also adjustment in a horizontal direction, and having the horizontal adjustment at a point sufficiently remote from the periphery of the wheels to prevent contact with the wheels.

2. The one-piece straight propelling-bar C, bearing-plate D, shaft B, to which the propelling-bar is connected, and the driving and supporting wheel A, mounted on said shaft, in combination with the beam carrying the implement to act on the soil and pivotally connected with the supporting and driving mechanism, so as to allow only vertical and horizontal adjustment of the beam, for the purposes set forth.

3. The one-piece propelling-bar C, bearing-plate D, shaft B, to which the propelling-bar is connected, and the driving and supporting wheels A, mounted on said shaft, in combination with the beam carrying the implement to act on the soil and pivotally connected with the supporting and driving mechanism, so as to allow only vertical and horizontal adjustment of the beam, for the purposes set forth.

In testimony whereof I affix my signature in presence of two witnesses.

JAMES A. EVERITT.

Witnesses:
JOSEPH A. MINTURN,
WILL A. ESHBACH.